(12) United States Patent
Healey et al.

(10) Patent No.: US 10,300,381 B2
(45) Date of Patent: May 28, 2019

(54) EFFECTING AFFECTIVE STATE THROUGH GAME TECHNOLOGY

(71) Applicant: Intel Corporation, Santa Clara, CA (US)

(72) Inventors: Jennifer A. Healey, San Jose, CA (US); Lama Lachman, Santa Clara, CA (US); Rita H. Wouhaybi, Portland, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 15/282,674

(22) Filed: Sep. 30, 2016

(65) Prior Publication Data

US 2018/0093182 A1 Apr. 5, 2018

(51) Int. Cl.
*A63F 13/46* (2014.01)
*A63F 13/79* (2014.01)
*A63F 13/212* (2014.01)
*A63F 13/92* (2014.01)

(52) U.S. Cl.
CPC ............ *A63F 13/46* (2014.09); *A63F 13/212* (2014.09); *A63F 13/79* (2014.09); *A63F 13/92* (2014.09)

(58) Field of Classification Search
CPC ........ A63F 13/46; A63F 13/212; A63F 13/25; A63F 13/79
USPC ........................................................... 463/36
See application file for complete search history.

(56) References Cited

U.S. PATENT DOCUMENTS

| | | | |
|---|---|---|---|
| 2009/0325701 A1* | 12/2009 | Andres Del Valle | A63F 13/12 463/36 |
| 2012/0157127 A1 | 6/2012 | Ferren et al. | |
| 2014/0274413 A1* | 9/2014 | Chelst | A63F 13/795 463/42 |
| 2016/0063204 A1* | 3/2016 | Srinivasan | G06F 19/3418 705/2 |
| 2017/0228135 A1* | 8/2017 | Vendrow | G06F 3/04845 |

\* cited by examiner

*Primary Examiner* — Michael A Cuff
(74) *Attorney, Agent, or Firm* — Jordan IP Law, LLC

(57) ABSTRACT

Systems, apparatuses and methods may leverage technology that identifies sensor data, automatically determines a change in an affective state of one or more individuals based at least in part on the sensor data and conducts an update to a game score based on the change in the affective state. In one example, the game score is associated with a player and the one or more individuals are individuals other than the player.

24 Claims, 4 Drawing Sheets

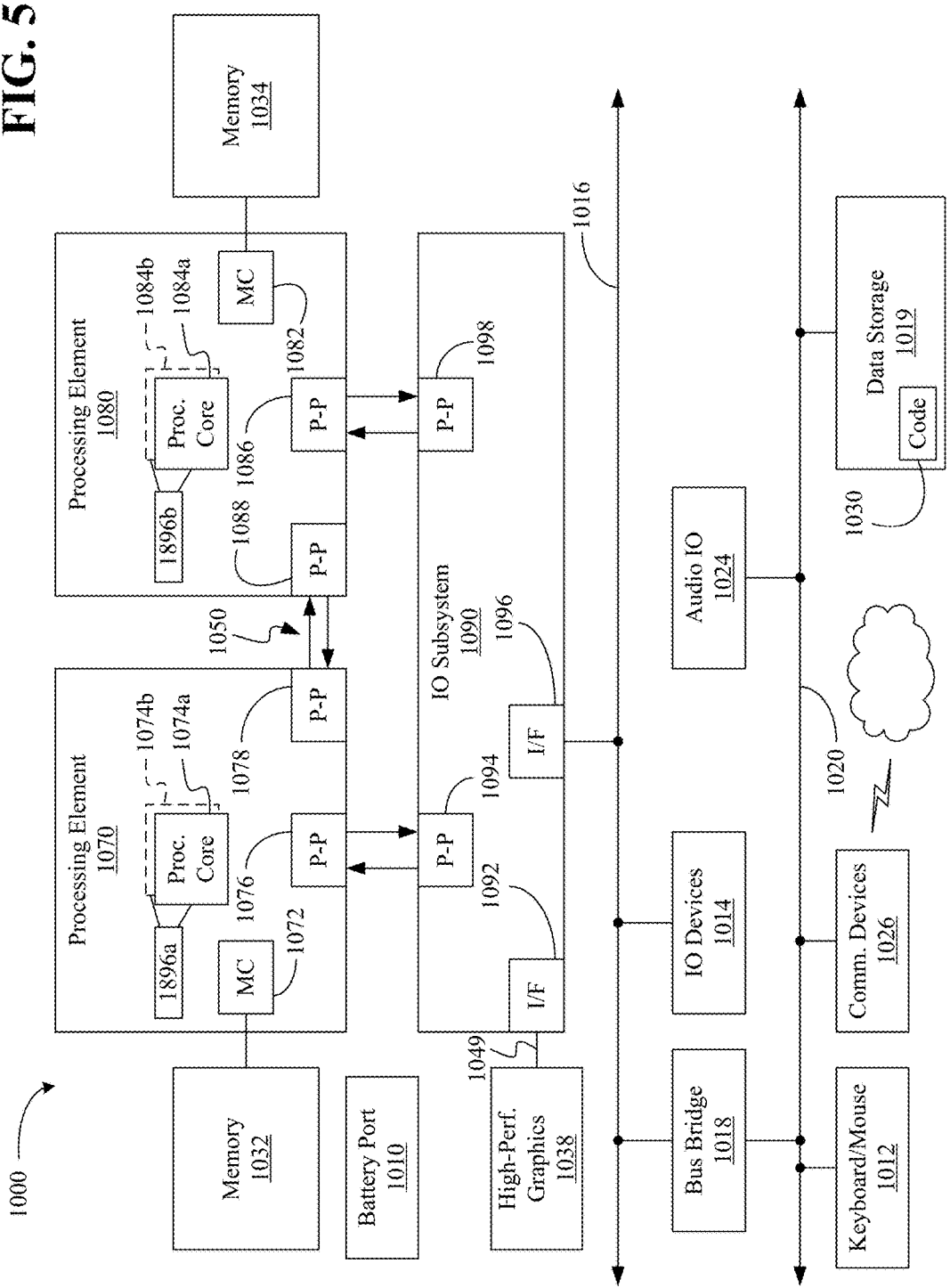

EFFECTING AFFECTIVE STATE THROUGH GAME TECHNOLOGY

TECHNICAL FIELD

Embodiments generally relate to the management of affective states. More particularly, embodiments relate to effecting affective states through game technology.

BACKGROUND

Individuals may often strive to do "good" in the world and create a positive impact on those around them, but sometimes they may be uncertain of the best way to achieve this goal. Indeed, it may be common for people to lose track of this goal in the pressures of everyday life. In addition to "doing good", individuals may also strive to avoid "doing harm" by spreading their own negative emotions. For example, if a person is leading a stressful life, one side effect may be (often unintentionally) spreading stress to loved ones, colleagues and other people with whom one has daily interactions. Individuals may occasionally be made aware of the effects that they have on others either directly (e.g., implicitly or explicitly) in the moment or indirectly by hearing about it later. If, however, the feedback is delayed, ineffective or not delivered in a way in which individuals can consume it, the feedback may not be useful.

BRIEF DESCRIPTION OF THE DRAWINGS

The various advantages of the embodiments will become apparent to one skilled in the art by reading the following specification and appended claims, and by referencing the following drawings, in which:

FIG. 5 is a block diagram of an example of a computing system according to an embodiment.

DESCRIPTION OF EMBODIMENTS

Figure 1:
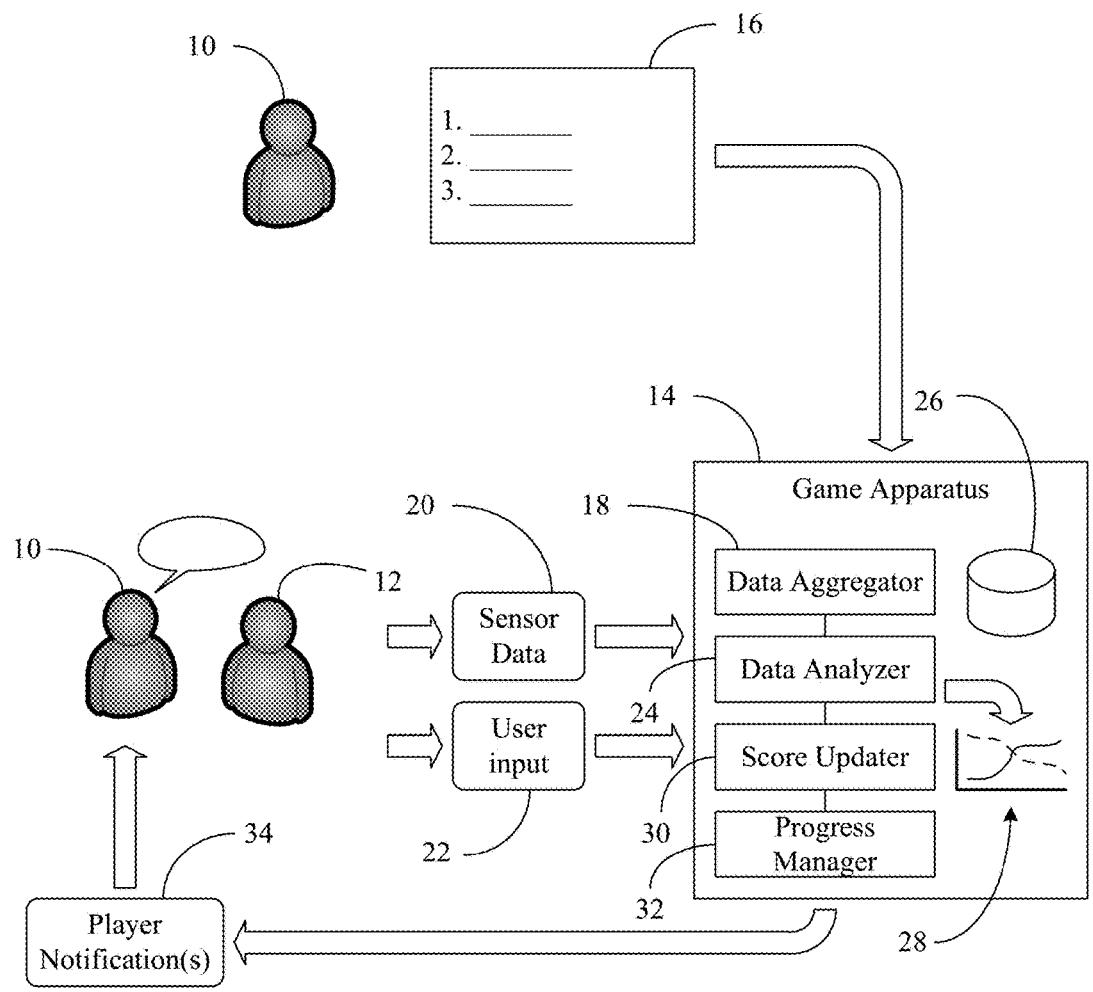
FIG. 1 is an illustration of an example of a game apparatus according to an embodiment.

Turning now to FIG. 1, a technology-based solution to managing the affective states of individuals is shown. In general, the words, actions and/or behavior of individuals such as, for example, a first individual 10 (e.g., player, person, user) may generally have an impact on the emotions, reactions, moods and/or feelings (e.g., "affective state") of one or more individuals other than the first individual 10 such as, for example, a second individual 12. As will be discussed in greater detail, the first individual 10 may use a game apparatus 14 to track and/or change the impact that the words, actions and/or behavior of the first individual 10 have on the affective state of the second individual 14.

For example, the first individual 10 might establish a user profile 16 that specifies one or more game objectives/goals related to affective states. Thus, a first objective may be to "cheer up" a particular friend suffering a loss, a second objective may be to "make three people happier today," a third objective may be to "inspire the audience," and so forth. The objectives of the user profile 16 may be entered into the game apparatus 14, which may be incorporated into a server, desktop computer, notebook computer, tablet computer, personal digital assistant (PDA), convertible tablet, wearable device, etc., or any combination thereof. The second individual 12 may or may not also be a game player.

The illustrated game apparatus 14, which may include logic instructions, configurable logic, fixed-functionality logic hardware, etc., or any combination thereof, uses a data aggregator 18 to identify sensor data 20. The sensor data 20 may be obtained from various sensors (e.g., cameras, watches, motion sensors, biological sensors, microphones, proximity sensors) worn by the first individual 10 and/or the second individual 12 or installed in environment/infrastructure. The sensor data 20 may therefore include, for example, timestamp data, geolocation (e.g., Global Positioning System/GPS) data, accelerometer data, wireless (e.g., WiFi media access control/MAC) addresses, pedometer data, electrocardiography/ECG data, battery state data, Bluetooth (e.g., Bluetooth Core Specification Version 4.0, Jun. 30, 2010, Bluetooth Special Interest Group/SIG) events, phone usage data, data traffic statistics, application usage data, headset usage data, light data, proximity data, orientation data, power state data, pressure data, operational settings, touch events, short messaging service (SMS) data, browser vents, audio features, etc.

The data aggregator 18 may also collect user input 22 from the first individual 10 and/or the second individual 12. For example, the second individual 12 might describe the emotions, mood or feelings experienced during and/or after one or more encounters with the first individual 10. Additionally, the first individual 10 may describe the reactions (e.g., smile, frown, laughter, etc.) of the second individual 12 observed by the first individual 10 during and/or after the encounter(s). The user input 22 may be responsive to one or more prompts by the game apparatus 14 and/or provided without prompting.

A data analyzer 24 may be communicatively coupled to the data aggregator 18, wherein the data analyzer 24 automatically determines a change in the affective state of the second individual 12 based on the sensor data 20 and/or the user input 22. In one example, the data analyzer 24 retrieves a set of rules from a rules database 26 and applies the set of rules to the sensor data 20 and/or the user input 22. The set of rules may include data analysis guidelines that are specific to one or more game objectives. Thus, if the user profile 16 contains the goal of having a positive impact on the second individual 12 (or all individuals encountered), a set of rules to use, for example, ECG data (e.g., heart rate), accelerometer data, touch events, etc., to detect signs of "positive" affect may be applied to the sensor data 20 and/or the user input 22. A positive change might be detected if the second individual 12 is more "positive" after interacting with the first individual 10 than before or if the "positivity" of the second individual 12 increases during the interaction. If the user profile 16 also specifies a goal to calm the second individual 12 down because he or she is upset, a set of rules to use, for example, timestamps, touch events, data traffic statistics, etc., to track "calmness" may also be applied to the sensor data 20 and/or the user input 22.

For example, from GPS and time, a high level location of the individuals 10, 12 might be inferred (e.g., at home, work, or the gym) and from audio data it may be inferred whether the individuals 10, 12 are in a quiet place (e.g., potentially alone), engaged in a conversation, typing, or asleep. Moreover, activity sensor data may be analyzed to infer physical and affective state. Thus, accelerometer data might be analyzed to determine the current activity or activity level of the second individual 12, or whether the second individual 12 might be recovering from physical exertion. Indeed, changes in heart rate may be tracked with respect to personalized profile averages and in light of activity levels. In addition, the user input 22 may be used both directly and analyzed for sentiment content, detection of active or passive voice in texts, work choice with respect to typical word usage, typing speed, response time, message length, and so forth. The user input 22 may also be obtained from multiple sources (e.g., social networking posts, TWEETS, text messages, e-mails, input across multiple participating devices and/or data feeds. If available, calendar data and other information associated with the second individual 12 may also be used to determine the context of events, comments and suggested feedback. Simply put, raw and interpreted data from a wide variety of settings may be used to ground context, infer affective state and quantify changes in affective state.

In this regard, the data analyzer 24 might create one or more real-time data recordings 28 (e.g., stored in non-volatile memory/NVM, not shown) that document the affective state of the second individual 12 over time. For example, the illustrated recording(s) 28 might include a pleasure curve (e.g., solid line) that indicates whether the second individual 12 is happy or sad, an intensity curve (e.g., dashed line) that indicates whether the second individual 12 is excited or calm, and so forth. Thus, the second individual 12 is both happy and calm in the illustrated example. Other factors such as, for example, dominance, may also be monitored.

The illustrated game apparatus 14 also includes a score updater 30 communicatively coupled to the data analyzer 24, wherein the score updater 30 conducts updates to one or more game scores based on the change in the affective state. For example, if the change in the affective state is positive, the score updater 30 may increase a game score associated with the first individual 10. Similarly, the score updater 30 may decrease the game score associated with the first individual 10 if the change in the affective state is negative. The amount of the score increase or decrease may be proportional to the positive or negative change in the affective state or in accordance with some other metric (e.g., weighted differently based on whether pleasure, intensity and/or dominance is impacted). The game score(s) may be individual scores or team scores (e.g., a group of coworkers focused on cheering up someone in the office).

In the case of team scores, the apparatus 14 might search for other players who may have an impact on the goal score and invite them to play (e.g., via text message, email, instant message/IM, or other suitable communication channel). In this regard, the game apparatus 14 may also be used to create a dynamic group of people to offset a negative person with whom many people interact. This negative person might be someone at work or someone who works at a retail store that users have no way of avoiding. In this case, it may be that group interactions are coordinated to minimize the effect of that person, or even provide a positive interaction to others immediately after the negative interaction in order to offset its effect.

In a multi-player multi-goal game scenario, groups may potentially require changes of behavior to continue streaming data related to their sensed emotions. For example, if a manager, a speaker, or a parent is not making progress from their negative attitude towards others around them, the group may decide to prevent (e.g., "lock") the group data from being shared. In addition, such data may have some conditions on being shared in order to provide basic privacy protection. For example, if a manager is meeting with only a single person (e.g., a "1:1" meeting), then the data may be kept private. Data coming from several 1:1's with employees, however, may be aggregated across time and presented as one contextual output. Moreover, data from meetings with several individuals may also be aggregated, presented to the player and/or used to update the game score. Thus, an individual might have separate contextual scores (i.e., work, home, basketball team).

Additionally, the game apparatus 14 may continually re-engage the first individual 10 and help the first individual 10 to track progress. As already noted, the game apparatus 14 may also enable multiple people to act collectively towards a common goal. As a specific example, if someone in a group has experienced a deep loss, many people may initially send their condolences, but then soon forget the person's loss. In such a case, the game apparatus 14 may enable the concerned group to collectively understand both how the person was feeling and how their actions, individually and collectively were impacting the person. The game apparatus 14 may also remind the group of the person's emotional state over the following weeks and months and potentially nudge behaviors towards that person in order to create a positive emotional impact.

The game apparatus 14 may also enable asynchronous feedback regarding one's actions. For example, the first individual 10 might notice that a neighbor had forgotten to roll their trash can to the curb, and do it for them. This small act of kindness might actually have had a relatively large positive impact on the neighbor's day. The illustrated game apparatus 14 enables this kind of feedback to be communicated to the first individual 10. Moreover, the feedback may be authenticated by context and emotional state data that the game apparatus 14 collects from mobile devices such as smart phones, smart watches, wearable devices, etc., that people will very often be wearing or carrying.

The game apparatus 14 may therefore also include a progress manager 32 communicatively coupled to the score updater 30. The progress manager 32 may generate one or more real-time player notifications 34 of the updates to the game score. The notifications 34 may also include behavioral suggestions. The notifications 34 may be communicated to the first individual 10 visually (e.g., via a wearable device display), audibly (e.g., via headset), haptically, etc., or any combination thereof. In this regard, the real-time nature of the player notifications 34 may enable the first individual 10 to change (e.g., if the score is decreased) or continue (e.g., if the score is increased) the current behavior of the first individual 10 during the interaction with the second individual 12 in order to achieve a better interpersonal result.

The score updater 30 may also wait for feedback from the person encountered and take into consideration longer term effects of the interaction. Additionally, the rules used to update the score may to depend on the game goals. For example, if the goal is to generate short term excitement (e.g., perhaps to close a sale in a specified time window), then the rules might specify that only affective impacts in the relevant time window are to be considered. If the goal is longer term, however, the rules might apply a type of kernel filter to weight the impact of the player during the interaction and for some time following the interaction. Various point multipliers might also be specified by the rules for impact at a particular place or time or in a particular context.

The game may be "won" at the closure of each goal, with a score being assessed and feedback being given to the player. As already noted, the player may also receive periodic updates on their progress towards goals and suggestions for potential interventions during the game.

Figure 2:
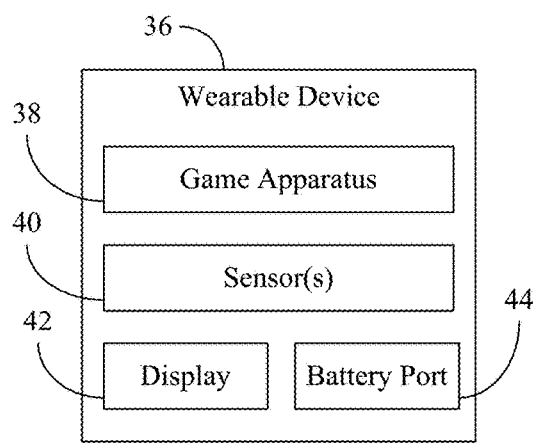
FIG. 2 is a block diagram of an example of a wearable device according to an embodiment.

FIG. 2 shows a wearable device 36 that includes a game apparatus 38, one or more sensors 40, an embedded display 42 and a battery port 44 to supply power to the wearable device. The wearable device 36 might include, for example, an eyewear, wristwear, headwear, jewelry, footwear and/or clothing form factor and the sensors 40 may include, for example, GPS receivers, ECG monitors, pedometers, cameras, pressure gauges, microphones, etc, or any combination thereof. Additionally, the game apparatus 38 may be configured to operate similarly to the game apparatus 14 (FIG. 1), already discussed. Accordingly, the game apparatus 38 may identify sensor data, automatically determine a change in an affective state of one or more individuals based at least in part on the sensor data, and conduct a score update based on the change in the affective state. In one example, the game apparatus 38 generates one or more player notifications of the updates to the game score(s) and communicates the player notifications to a user of the wearable device 36 via the display 42 or other suitable user interface (UI).

Figure 3:
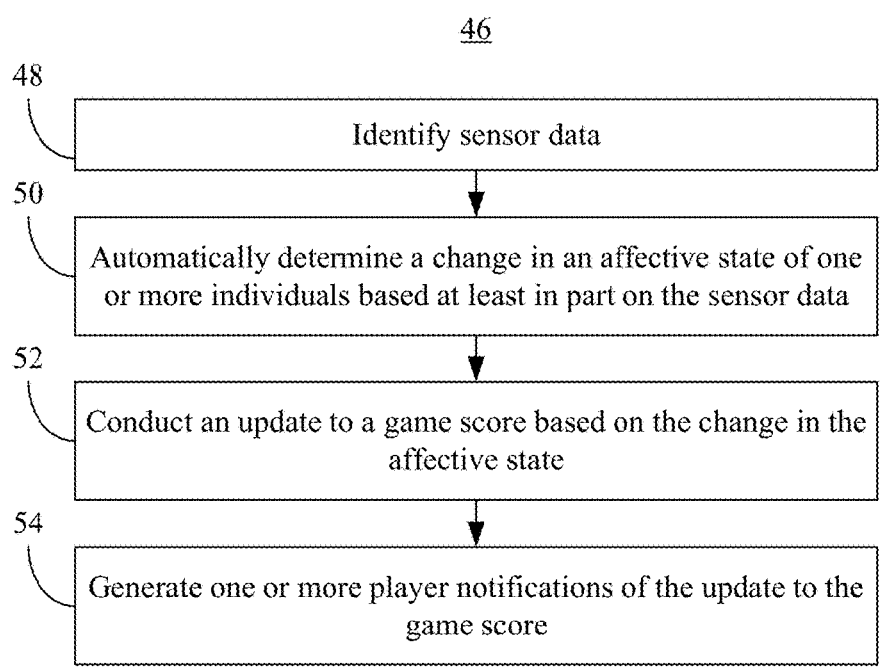
FIG. 3 is a flowchart of an example of a method of operating a game apparatus according to an embodiment.

FIG. 3 shows a method 46 of operating a game apparatus. The method 46 may generally be implemented in a game apparatus such as, for example, the game apparatus 14 (FIG. 1) and/or the game apparatus 38 (FIG. 2), already discussed. More particularly, the method 46 may be implemented in one or more modules as a set of logic instructions stored in a machine- or computer-readable storage medium such as random access memory (RAM), read only memory (ROM), programmable ROM (PROM), firmware (FW), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 46 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 48 provides for identifying sensor data, wherein block 50 may automatically determine a change in an affective state of one or more individuals based at least in part on the sensor data. As already noted, the change in the affective state may also be determined based on user input. In one example, block 50 includes retrieving a set of rules from a rules database and applying the set of rules to the sensor data and/or the user input, wherein the set of rules are specific to one or more game objectives. Additionally, block 52 may conduct an update to a game score based on the change in the affective state. Block 52 might include, for example, increasing the game score if the change in the affective state is positive and decreasing the game score if the change in the affective state is negative. Illustrated block 54 generates one or more player notifications of the update to the game score.

Accordingly, the method 46 may establish a multi-participant mobile game where the goals of the game are related to creating various positive affective responses in others. The core technologies of the game may include mobile computation with sensing and communication technologies (such as a smart phone, smart watch and associated wearable devices) and a framework that enables users to share abstracted data and feedback with each other through the game. The framework might include, for example, machine learning technology that infers the affective state of participants, as well high level context information.

The game objectives/goals might be either individual or collective and may vary in duration as would be appropriate to the task. Potential game goals with examples of relevant durations might include:

A long term goal to have a positive impact on those around the player (e.g., individual, long term goal that includes all players with whom the player interacts);

A mid-term collective team goal where a group of co-workers work together to cheer up a fellow co-worker who has experienced a death in the family;

A short term goal of an individual to excite a group of people to whom she is delivering a presentation.

Other goals may be context-specific, such as associating a goal with a playtime in a movie theater that measures the frequency of peaks in emotions in the audience. Moreover, groups can be dynamically suggested and formed in real-time by the system by correlating the contexts and goals of players.

The framework of the game may track the objectives of each player and the people/players associated with the goal. Each interaction with another individual may result in a score for that interaction being applied to each of the relevant goals associated with the player. For example, a player who establishes both the individual long term goal of making a positive impact on people and the collective team goal of cheering up a particular co-worker, an interaction with the co-worker in question may be scored and applied to both goals.

Thus, the game may be adjusted scored using both explicit user contributed content (e.g., a message from someone saying "Thanks! You made my day!") and inferred affective states interpreted from sensor data. The inferences from sensor data may either be inferences on sensor data from devices operated and/or worn by other participants who have opted in to share (e.g., heart rate, phone activity, features of audio) or from sensor data collected by devices operated and/or worn by the player. Devices operated and/or worn by the player may capture information from the surroundings (e.g., detecting a smile on someone else's face using a wearable camera or detecting someone else laughing using the audio captured by a smart phone).

Each player may opt in and select the sensor data that they are willing to share with the game as well as any other privacy constraints. The game may be implemented either in a cloud-based fashion, a distributed fashion or a combination/hybrid thereof. In a cloud-based implementation, mobile and wearable devices might stream data to a private or public cloud service hosting the game. In the distributed implementation, a smart phone operated by the player may serve as a sensor hub for the game, a host to the game application itself and a user input platform. A hybrid solution might rely on cloud-based intelligence and data aggregation, with potentially part of the computation occurring locally to an end node, or even in a peer-to-peer fashion to preserve privacy (e.g., audio and video being processed locally and only high level results being uploaded, if needed, to a centralized cloud infrastructure).

In the game, the interactions of a player with others may be noted, either because the player intentionally marked the interaction or because the interaction might be inferred by device proximity or other trigger. Interactions may include both face-to-face encounters and social communication by email, text, or phone, for example. In person meetings may be inferred, for example, by device proximity (e.g. Bluetooth/WiFi scan, Bluetooth Low Energy/BTLE, local proximity detection), audio correlation, face recognition software or word spotting in a greeting, (e.g. "Hi John!"). Electronic interactions may be noted by triggers associated with sending electronic correspondence (e.g., flagged contacts) or reading electronic communications (e.g., opening email, reading messages on any message exchange: FACEBOOK, SKYPE, WHAT'S APP, etc.).

Additionally, interactions with people outside the game can be taken into consideration. In this case, sensing modalities that do not rely on the other person's sensors will be critical to evaluate the response of a participant's action. Wearable cameras and/or audio recognition might be used, with the correct privacy framework being in place (i.e., capture features and high level context (laugh, smile) and discard raw data). Individuals may also leave time and location stamped comments (geotagged) that other people in the general area at the same time might have access to.

Figure 4:
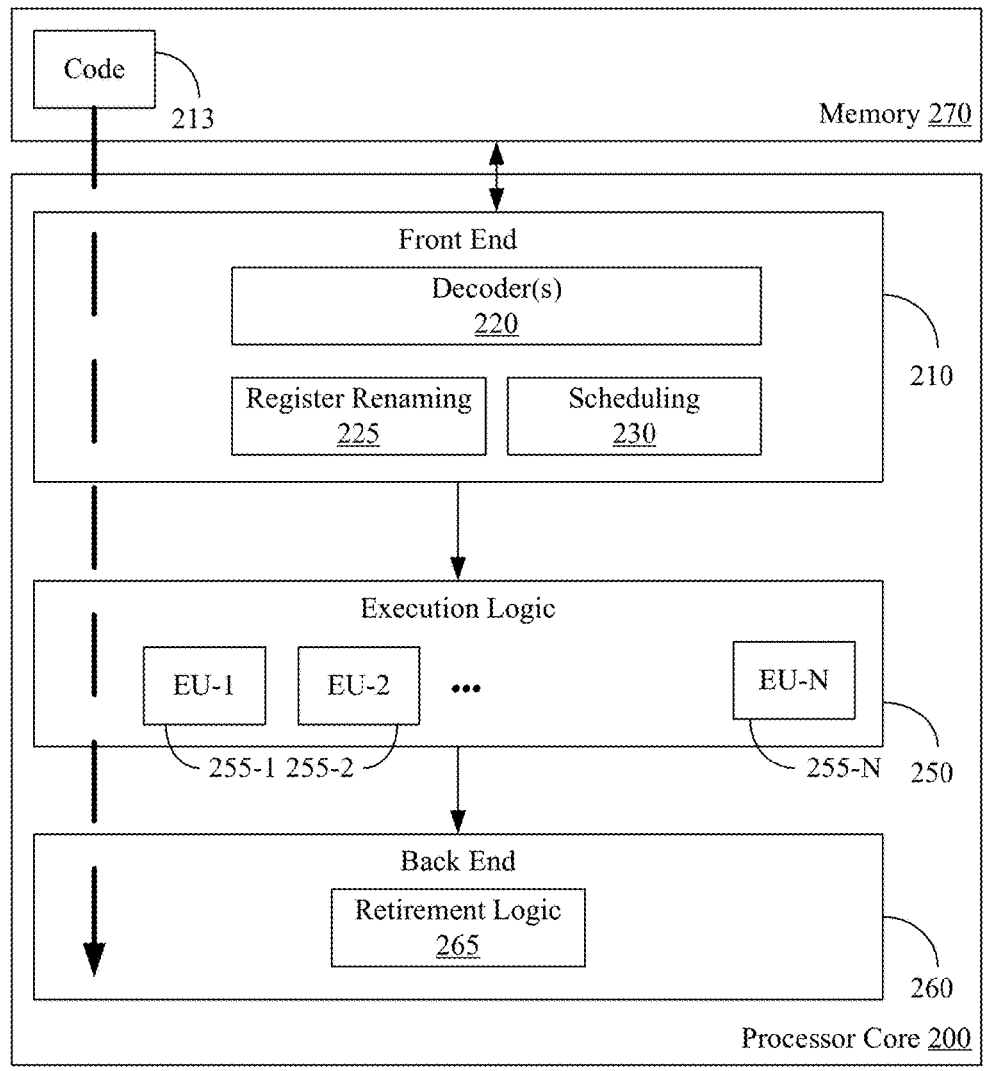
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 46 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 5, shown is a block diagram of a computing system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 46 (FIG. 3), already discussed, and may be similar to the code 213 (FIG. 4), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes And Examples

Example 1 may include a game apparatus comprising a data aggregator to identify sensor data, a data analyzer communicatively coupled to the data aggregator, the data analyzer to automatically determine a change in an affective state of one or more individuals based at least in part on the sensor data, and a score updater communicatively coupled to the data analyzer, the score updater to conduct an update to a game score based on the affective state.

Example 2 may include the apparatus of Example 1, wherein the game score is to be associated with a player and the one or more individuals are to be individuals other than the player.

Example 3 may include the apparatus of Example 1, wherein the score updater is to increase the game score if the change in the affective state is positive and decrease the game score if the change in the affective state is negative.

Example 4 may include the apparatus of Example 1, further including a rules database, wherein the data analyzer is to retrieve a set of rules from the rules database and apply the set of rules to the sensor data, and wherein the set of rules are to be specific to one or more game objectives.

Example 5 may include the apparatus of Example 1, further including a progress manager communicatively coupled to the score updater, the progress manager to generate one or more player notifications of the update to the game score.

Example 6 may include the apparatus of Example 1, wherein the data aggregator is to identify user input, wherein the change in the affective state is to be determined further based on the user input.

Example 7 may include the apparatus of any one of Examples 1 to 6, wherein the game score is to be an individual score.

Example 8 may include the apparatus of any one of Examples 1 to 6, wherein the game score is to be a team score.

Example 9 may include a method of operating a game apparatus, comprising identifying sensor data, automatically determining a change in an affective state of one or more individuals based at least in part on the sensor data, and conducting an update to a game score based on the change in the affective state.

Example 10 may include the method of Example 9, wherein the game score is associated with a player and the one or more individuals are individuals other than the player.

Example 11 may include the method of Example 9, wherein conducting the update includes increasing the game score if the change in the affective state is positive, and decreasing the game score if the change in the affective state is negative.

Example 12 may include the method of Example 9, wherein automatically determining the change in the affective state includes retrieving a set of rules from a rules database, and applying the set of rules to the sensor data, wherein the set of rules are specific to one or more game objectives.

Example 13 may include the method of Example 9, further including generating one or more player notifications of the update to the game score.

Example 14 may include the method of Example 9, further including identifying user input, wherein the change to the affective state is determined further based on the user input.

Example 15 may include the method of any one of Examples 9 to 14, wherein the game score is an individual score.

Example 16 may include the method of any one of Examples 9 to 14, wherein the game score is a team score.

Example 17 may include at least one computer readable storage medium comprising a set of instructions which, when executed by a computing device, cause the computing device to identify sensor data, automatically determine a change in an affective state of one or more individuals based at least in part on the sensor data, and conduct an update to a game score based on the affective state.

Example 18 may include the at least one computer readable storage medium of Example 17, wherein the game score is to be associated with a player and the one or more individuals are to be individuals other than the player.

Example 19 may include the at least one computer readable storage medium of Example 17, wherein the instructions, when executed, cause the computing device to increase the game score if the change in the affective state is positive, and decrease the game score if the change in the affective state is negative.

Example 20 may include the at least one computer readable storage medium of Example 17, wherein the instructions, when executed, cause the computing device to retrieve a set of rules from a rules database, and apply the set of rules to the sensor data, wherein the set of rules are to be specific to one or more game objectives.

Example 21 may include the at least one computer readable storage medium of Example 17, wherein the instructions, when executed, cause the computing device to generate one or more player notifications of the update to the game score.

Example 22 may include the at least one computer readable storage medium of Example 17, wherein the instructions, when executed, cause the computing device to identify user input, wherein the change to in the affective state is to be determined further based on the user input.

Example 23 may include the at least one computer readable storage medium of any one of Examples 17 to 22, wherein the game score is to be an individual score.

Example 24 may include the at least one computer readable storage medium of any one of Examples 17 to 22, wherein the game score is to be a team score.

Example 25 may include a game apparatus comprising means for identifying sensor data, means for automatically determining a change in an affective state of one or more individuals based at least in part on the sensor data, and means for conducting an update to a game score based on the change in the affective state.

Example 26 may include the apparatus of Example 25, wherein the game score is to be associated with a player and the one or more individuals are to be individuals other than the player.

Example 27 may include the apparatus of Example 25, wherein the means for conducting the update includes means for increasing the game score if the change in the affective state is positive, and means for decreasing the game score if the change in the affective state is negative.

Example 28 may include the apparatus of Example 25, wherein the means for automatically determining the change in the affective state includes means for retrieving a set of rules from a rules database, and means for applying the set of rules to the sensor data, wherein the set of rules are specific to one or more game objectives.

Example 29 may include the apparatus of Example 25, further including means for generating one or more player notifications of the update to the game score.

Example 30 may include the apparatus of Example 25, further including means for identifying user input, wherein the change to the affective state is determined further based on the user input.

Example 31 may include the apparatus of any one of Examples 25 to 30, wherein the game score is to be an individual score.

Example 32 may include the apparatus of any one of Examples 25 to 30, wherein the game score is to be a team score.

Thus, technology described herein may collect data from mobile and ubiquitous computational devices, assess affective (e.g., emotional) states and high level context from the data, and incorporate these states from multiple users into a multi-player game. The game may enable both individuals and teams to pursue affective goals such as "cheer up" a particular friend suffering a loss, "make three people happier today," or "inspire the audience". Groups might consist either of a persistent set of players or be dynamic "ad hoc" teams formed around specific timely goals or specific contexts. Players may not necessarily know each other in advance.

Accordingly, affective impact may be sensed, measured and tracked using feedback from users and data from wearable and mobile devices. Additionally, by tracking high level context, such as what the person is doing, where they are, who they are with, etc., key opportunities where interventions have the best impact may be identified.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a data aggregator to identify sensor data from an individual other than a player;
   a data analyzer communicatively coupled to the data aggregator, the data analyzer to:
   retrieve a set of rules from a rules database; and
   apply the set of rules to the sensor data to automatically determine a change in an affective state of the individual based at least in part on the sensor data, wherein the set of rules are to be specific to a game objective that is to be accomplished by the player and that is to include a pre-determined effect specified in a user profile together with an identification of the individual;
   a score updater communicatively coupled to the data analyzer, the score updater to conduct an update to a game score for the player based on the change in the affective state;
   a progress manager communicatively coupled to the score updater, the progress manager to generate one or more player notifications of the update to the game score; and
   a user interface communicatively coupled to the progress manager, the user interface to communicate the one or more player notifications to the player.

2. The apparatus of claim 1, wherein the score updater is to increase the game score if the change in the affective state is positive and decrease the game score if the change in the affective state is negative.

3. The apparatus of claim 1, wherein the data aggregator is to identify user input, wherein the update to the game score is to be conducted further based on the user input.

4. The apparatus of claim 1, wherein the game score is to be an individual score for the player.

5. The apparatus of claim 1, wherein the game objective is to be accomplished by two or more players, and wherein the game score is to be a team score for the two or more players based on the change in the affective state.

6. The apparatus of claim 5, wherein the apparatus is to:
   search for players that are to have an impact on the team score; and
   make an invitation to the players via a communication channel to establish a group including the two or more players.

7. The apparatus of claim 6, wherein the invitation is to include one or more of a text message, an electronic mail message, or an instant message.

8. The apparatus of claim 5, wherein the apparatus is to dynamically form a group including the two or more players to offset an affect of an interaction with a person.

9. The apparatus of claim 5, wherein the apparatus is to remind a group including the two or more players of a current affective state of the individual.

10. The apparatus of claim 9, wherein the apparatus is to to suggest a behavior to the two or more players to achieve the game objective.

11. The apparatus of claim 1, wherein the user profile is to allow the player to specify the pre-determined effect on the affective state for the individual and the identification of the individual.

12. The apparatus of claim 11, wherein the user profile is to allow the player to specify a plurality of game objectives that are to be accomplished by the player.

13. The apparatus of claim 1, wherein the user interface is to include one or more of a display device, an audio device, and a hepatic device.

14. The apparatus of claim 1, wherein the set of rules are to specify, based on the game objective, a pre-determined type of data from the sensor data to detect the change in the affective state of the individual.

15. A method comprising:
   identifying sensor data from an individual other than a player;
   retrieving a set of rules from a rules database;
   applying the set of rules to the sensor data to automatically determine a change in an affective state of the individual based at least in part on the sensor data, wherein the set of rules are to be specific to a game objective that is to be accomplished by the player and that is to include a pre-determined effect specified in a user profile together with an identification of the individual;
   conducting an update to a game score for the player based on the change in the affective state;
   generating one or more player notifications of the update to the game score; and
   communicating the one or more player notifications to the player via a user interface.

16. The method of claim 15, wherein conducting the update includes:
   increasing the game score if the change in the affective state is positive; and
   decreasing the game score if the change in the affective state is negative.

17. The method of claim 15, further including identifying user input, wherein the update to the game store is conducted further based on the user input.

18. The method of claim 15, wherein the game score is an individual score for the player.

19. The method of claim 15, wherein the game objective is to be accomplished by two or more players, and wherein the game score is a team score for the two or more players based on the change in the affective state.

20. At least one computer readable storage medium comprising a set of instructions which, when executed by a computing device, cause the computing device to:
   identify sensor data from an individual other than a player;
   retrieve a set of rules from a rules database;
   apply the set of rules to the sensor data to automatically determine a change in an affective state of the individual based at least in part on the sensor data, wherein the set of rules are to be specific to a game objective that is to be accomplished by the player and that is to include a pre-determined effect specified in a user profile together an identification of the individual;

conduct an update to a game score for the player based on the change in the affective state;

generate one or more player notifications of the update to the game score; and communicate the one or more player notifications to the player via a user interface.

21. The at least one computer readable storage medium of claim 20, wherein the instructions, when executed, cause the computing device to:

increase the game score if the change in the affective state is positive; and decrease the game score if the change in the affective state is negative.

22. The at least one computer readable storage medium of claim 20, wherein the instructions, when executed, cause the computing device to identify user input, wherein the update to the game score is to be conducted further based on the user input.

23. The at least one computer readable storage medium of claim 20, wherein the game score is to be an individual score for the player.

24. The at least one computer readable storage medium of claim 20, wherein the game objective is to be accomplished by two or more players, and wherein the game score is to be a team score for the two or more players based on the change in the affective state.

* * * * *